(12) United States Patent
Yu et al.

(10) Patent No.: US 9,904,090 B2
(45) Date of Patent: Feb. 27, 2018

(54) TOUCH DISPLAY PANEL AND TOUCH DISPLAY DEVICE

(71) Applicants: BOE TECHNOLOGY GROUP CO., LTD., Beijing (CN); CHONGQING BOE OPTOELECTRONICS TECHNOLOGY CO., LTD.

(72) Inventors: Daoping Yu, Beijing (CN); Gyuhyun Lee, Beijing (CN); Qichao Chen, Beijing (CN); Fujun Liu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 160 days.

(21) Appl. No.: 14/787,974

(22) PCT Filed: Jan. 26, 2015

(86) PCT No.: PCT/CN2015/071532
§ 371 (c)(1),
(2) Date: Oct. 29, 2015

(87) PCT Pub. No.: WO2016/078216
PCT Pub. Date: May 26, 2016

(65) Prior Publication Data
US 2016/0357047 A1    Dec. 8, 2016

(30) Foreign Application Priority Data

Nov. 21, 2014 (CN) .......................... 2014 1 0676885

(51) Int. Cl.
  *G02F 1/1335*    (2006.01)
  *G02F 1/1333*    (2006.01)
  (Continued)

(52) U.S. Cl.
  CPC ...... *G02F 1/13338* (2013.01); *G02F 1/13439* (2013.01); *G02F 1/134336* (2013.01);
  (Continued)

(58) Field of Classification Search
  CPC .... G06F 3/041; G06F 3/0412; G02F 1/13338; G02F 1/13439; G02F 1/134336; G02F 1/133514; G02F 1/133512
  (Continued)

(56) References Cited

U.S. PATENT DOCUMENTS 9,081,458 B2 *   7/2015   Zhou ..................... G06F 3/0412
2010/0315362 A1  12/2010  Cheng et al.
(Continued)

FOREIGN PATENT DOCUMENTS

CN    102830556 A    12/2012
CN    103049157 A     4/2013
(Continued)

OTHER PUBLICATIONS

First Office Action regarding Chinese application No. 201410676885.7, dated Nov. 4, 2016. Translation provided by Dragon Intellectual Property Law Firm.
(Continued)

*Primary Examiner* — Hoan C Nguyen
(74) *Attorney, Agent, or Firm* — Harness, Dickey & Pierce, P.L.C.

(57) ABSTRACT

The present disclosure provides a touch display panel and a touch display device. The touch display panel includes a color filter substrate, an array substrate arranged opposite to the color filter substrate, and a liquid crystal layer arranged between the color filter substrate and the array substrate. Black matrices are arranged on the color filter substrate. A plurality of first electrodes made of metal is arranged parallel to each other on the color filter substrate, and a
(Continued)

projection of each first electrode onto the color filter substrate in a perpendicular direction completely falls within a range of a corresponding black matrix. A plurality of second electrodes made of a transparent conductive layer is further arranged parallel to each other on the color filter substrate, and the second electrodes are insulated from, and cross, the first electrodes.

18 Claims, 2 Drawing Sheets

(51) Int. Cl.
*G02F 1/1343* (2006.01)
*G06F 3/041* (2006.01)
*G06F 3/044* (2006.01)

(52) U.S. Cl.
CPC ............ *G06F 3/044* (2013.01); *G06F 3/0412* (2013.01); *G02F 1/133512* (2013.01); *G02F 1/133514* (2013.01); *G02F 2001/133357* (2013.01); *G06F 2203/04103* (2013.01); *G06F 2203/04107* (2013.01)

(58) Field of Classification Search
USPC .......................................................... 349/12
See application file for complete search history.

(56) References Cited

U.S. PATENT DOCUMENTS

| | | | | |
|---|---|---|---|---|
| 2013/0147730 | A1* | 6/2013 | Chien | ................... G06F 3/0412 345/173 |
| 2014/0071360 | A1* | 3/2014 | Chang | ................... G06F 3/0412 349/12 |
| 2014/0160376 | A1* | 6/2014 | Wang | ....................... G06F 3/044 349/12 |
| 2015/0378494 | A1* | 12/2015 | Cok | ....................... G06F 3/0416 345/174 |
| 2016/0109977 | A1* | 4/2016 | Hashimoto | ............. G06F 3/044 345/174 |

FOREIGN PATENT DOCUMENTS

| | | |
|---|---|---|
| CN | 103792711 A | 5/2014 |
| CN | 204189151 U | 3/2015 |
| TW | 200921483 A | 5/2009 |

OTHER PUBLICATIONS

International Search Report and Written Opinion of the International Searching Authority for international application No. PCT/CN2015/071532, dated Jan. 26, 2015.

* cited by examiner

TOUCH DISPLAY PANEL AND TOUCH DISPLAY DEVICE

CROSS-REFERENCE TO RELATED APPLICATION

The present application is the U.S. national phase of PCT Application No. PCT/CN2015/071532 filed on Jan. 26, 2015, which claims a priority of the Chinese patent application No. 201410676885.7 filed on Nov. 21, 2014, which is incorporated herein by reference in its entirety.

TECHNICAL FIELD

The present disclosure relates to the field of touch technology, in particular to a touch display panel and a touch display device.

BACKGROUND

Currently, a touch panel available in the market includes an Add-on touch panel and an integrated touch panel. For the integrated touch panel, a touch panel is integrated into a liquid crystal display panel in two ways, i.e., arranging the touch panel on a color filter substrate of the liquid crystal display panel (which is also called as "on-cell" integration) and arranging the touch panel between the color filter substrate and an array substrate of the liquid crystal display panel (which is also called as "in-cell" integration).

The on-cell integration is commonly used in the art. In order not to adversely affect the light transmission of the touch display panel, in the related art, a transmitter electrode made of a transparent conductive layer is arranged at a side of the color filter substrate facing the array substrate, and a receiver electrode also made of the transparent conductive layer is arranged at the other side of the color filter substrate. However, because the transmitter electrode is located at an inner side of the color filter substrate, the deflection of liquid crystals may be disturbed by a touch signal, thereby a display effect of the touch display panel may be adversely affected. In addition, mutual interference may also occur between a signal on a thin film transistor (TFT) and the touch signal, so the sensitivity of the touch display panel will be deteriorated. Further, for a display panel where a common electrode is shared, a common electrode signal and the touch signal may be multiplexed in a time-division manner. For a twisted-nematic (TN) display panel, the touch signal may be shielded by the transparent conductive layer at the color filter substrate. The resistivity of the transparent conductive layer is relatively high, so the load of the touch display panel is relatively large due to the transmitter electrode and the receiver electrode made of the transparent conductive layer, thereby the sensitivity of the touch display panel will be further deteriorated.

SUMMARY

An object of the present disclosure is to provide a touch display panel and a touch display device, so as to ensure a display effect of the touch display panel, reduce the load and improve the sensitivity thereof.

In one aspect, the present disclosure provides in one embodiment a touch display panel including a color filter substrate, an array substrate arranged opposite to the color filter substrate, and a liquid crystal layer arranged between the color filter substrate and the array substrate. Black matrices are arranged on the color filter substrate. A plurality of first electrodes made of metal is arranged parallel to each other on the color filter substrate, and a projection of each first electrode onto the color filter substrate in a perpendicular direction completely falls within a range of a corresponding black matrix. A plurality of second electrodes made of a transparent conductive layer is further arranged parallel to each other on the color filter substrate, and the second electrodes are insulated from, and cross, the first electrodes. The first electrodes are transmitter electrodes and the second electrodes are receiver electrodes, or the first electrodes are receiver electrodes and the second electrodes are transmitter electrodes.

Further, the first electrodes are arranged at a side of the color filter substrate facing the array substrate, and the second electrodes are arranged at a side of the color filter substrate away from the array substrate.

Further, the first electrodes are transmitter electrodes, and the second electrodes are receiver electrodes.

Further, the touch display panel includes a transparent shielding layer arranged between the first electrodes and the liquid crystal layer.

Further, the first electrodes are arranged at a side of the black matrices facing the array substrate.

Further, the touch display panel includes a first planarization layer arranged between the transparent shielding layer and the first electrodes.

Further, the touch display panel includes a second planarization layer arranged at a pixel region defined by the black matrices and a color filter layer arranged on the second planarization layer, and the first planarization layer is arranged on the color filter layer.

Further, the touch display panel includes a color filter layer arranged at a pixel region defined by the black matrices, and the first planarization layer is arranged on the color filter layer.

Further, the first electrode is made of a material selected from the group consisting of Mo, Al, Cu and Ag.

Further, the first electrodes are arranged perpendicular to the second electrodes.

Further, the first electrodes and the second electrodes are each of a diamond, strip or grid-like shape.

In another aspect, the present disclosure provides in one embodiment a touch display device including the above-mentioned touch display panel.

According to the embodiment of the present disclosure, the first electrodes are made of metal, and the projection of each first electrode onto the color filter substrate in a perpendicular direction falls within the range of the corresponding black matrix. In this way, through the non-transparent black matrices, the light transmission of the touch display panel is not adversely affected by the first electrodes. In addition, when the first electrodes are made of metal with low resistivity, it is able to reduce the load of the touch display panel, thereby to reduce the power consumption and improve the sensitivity thereof.

DETAILED DESCRIPTION

Figure 1:
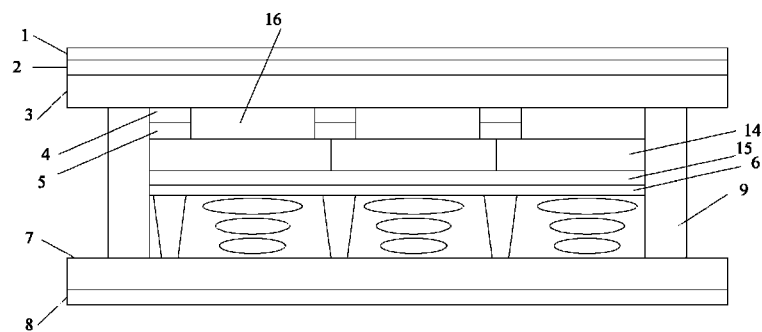
FIG. 1 is a sectional view of a touch display panel according to the first embodiment of the present disclosure.

In order to make the objects, the technical solutions and the advantages of the present disclosure more apparent, the present disclosure will be described hereinafter in conjunction with the drawings and embodiments.

The present disclosure provides in the embodiments a touch display panel and a touch display device, so as to ensure a display effect, reduce the load and improve the sensitivity of the touch display panel.

The touch display panel includes a color filter substrate, an array substrate arranged opposite to the color filter substrate, and a liquid crystal layer arranged between the color filter substrate and the array substrate. Black matrices are arranged on the color filter substrate. A plurality of first electrodes made of metal is arranged parallel to each other on the color filter substrate, and a projection of each first electrode onto the color filter substrate in a perpendicular direction completely falls within a range of the corresponding black matrix. A plurality of second electrodes made of a transparent conductive layer is further arranged parallel to each other on the color filter substrate, and the second electrodes are insulated from, and cross, the first electrodes. The first electrodes are transmitter electrodes and the second electrodes are receiver electrodes, or the first electrodes are receiver electrodes and the second electrodes are transmitter electrodes.

According to the touch display panel in the embodiments of the present disclosure, the first electrodes are made of metal, and the projection of each first electrode onto the color filter substrate in a perpendicular direction falls within the range of the corresponding black matrix. In this way, because of the non-transparent black matrices, the light transmission of the touch display panel is not adversely affected by the first electrodes. In addition, when the first electrodes are made of metal with low resistivity, it is able to reduce the load of the touch display panel, thereby to reduce the power consumption and improve the sensitivity thereof.

Alternatively, the first electrodes are arranged at a side of the color filter substrate facing the array substrate, and the second electrodes are arranged at a side of the color filter substrate away from the array substrate.

Further, the first electrodes are transmitter electrodes, and the second electrodes are receiver electrodes.

Further, the touch display panel includes a transparent shielding layer arranged between the first electrodes and the liquid crystal layer. The transparent shielding layer may be a transparent conductive layer. It may be used to shield an influence of a touch signal on the deflection of liquid crystals, thereby to ensure the display effect of the touch display panel. The transparent shielding layer may also be used to eliminate the mutual interference between a signal on a TFT and the touch signal, thereby to ensure the sensitivity of the touch display panel. In addition, for a TN-type touch display panel, the transparent conductive layer may serve as a common electrode. Because a signal voltage may remain unchanged during the operation, it may not interfere with the touch signal.

Further, the first electrodes are arranged at a side of the black matrices facing the array substrate.

Further, the touch display panel includes a first planarization layer arranged between the transparent shielding layer and the first electrodes.

Further, the touch display panel includes a second planarization layer arranged at a pixel region defined by the black matrices and a color filter layer arranged on the second planarization layer.

Further, the touch display panel includes a color filter layer arranged at a pixel region defined by the black matrices, and the first planarization layer is arranged on the color filter layer.

To be specific, the first electrode may be made of a metal material with excellent conductivity, such as Mo, Al, Cu or Ag.

Alternatively, the first electrodes and the second electrodes are arranged perpendicular to each other, and may each be of a diamond, strip or grid-like shape.

The present disclosure further provides in one embodiment a touch display device including the above-mentioned touch display panel. The touch display device may be any product or member having a display function, such as a liquid crystal panel, a liquid crystal TV, a liquid crystal display, a digital photo frame, a mobile phone or a flat-panel PC.

The touch display panel will be further described hereinafter in conjunction with the drawings and embodiments.

First Embodiment

A transmitter electrode is made of a transparent conductive layer at an inner side of a color filter substrate in the related art, so the deflection of liquid crystals may be disturbed by a touch signal, and thereby a display effect of a touch display panel may be adversely affected. In addition, mutual interference between a signal on a TFT and the touch signal may occur, so the sensitivity of the touch display panel may be reduced. Further, for a display panel where a common electrode serves as the transmitter electrode, a common electrode signal and the touch signal may be multiplexed in a time-division manner, so the time for the common electrode signal and scanning the touch signal is inadequate, thereby it is impossible to provide a product with a large size and a high pixel per inch (PPI). Meanwhile, the resistivity of the transparent conductive layer is relatively high, and when the transmitter electrode and the receiver electrode are made of the transparent conductive layer, the touch display panel may be of relatively large load, and its sensitivity may be further reduced. In order to reduce the load, it is required to provide a wider peripheral wire. However, at this time, it is unable to provide a product with a narrow bezel, so this is merely applicable to a small-sized touch display panel.

In order to overcome the above drawbacks, the present disclosure provides in this embodiment a touch display panel. As shown in FIG. 1, the touch display panel includes a color filter substrate, an array substrate, and a liquid crystal layer arranged between the color filter substrate and the array substrate. The color filter substrate includes a first base substrate 3, and the array substrate includes a second base substrate 7. Polarizers 1 and 8 are adhered onto the first base substrate 3 and the second base substrate 7, respectively. The color filter substrate and the array substrate are packaged together through a sealant 9.

A plurality of second electrodes made of a transparent conductive layer is arranged parallel to each other at a side of the first base substrate 3 away from the array substrate, and the second electrodes are arranged between the first base substrate 3 and the polarizer 1. A plurality of first electrodes made of metal is arranged parallel to each other at a side of the first base substrate 3 facing the array substrate, and a projection of each first electrode onto the first base substrate 3 in a perpendicular direction completely falls within a range of a corresponding black matrix 4. In this embodiment, the first electrode is a transmitter electrode 5, and the second electrode is a receiver electrode 2. According to this embodiment, the transmitter electrodes 5 are made of non-transparent metal, and a projection of each transmitter electrode 5 onto the first base substrate 3 in the perpendicular direction falls within the range of the corresponding black matrix 4. In this way, because of the non-transparent black matrices 4, the light transmission of the touch display panel may not be adversely affected by the transmitter electrodes 5. To be specific, the transmitter electrode 5 may be made of a metal material with good conductivity, such as Mo, Al, Cu or Ag, so as to reduce the load of the touch display panel, thereby to reduce the power consumption and improve the sensitivity thereof. Meanwhile, it is also able to reduce a width of a peripheral wire, thereby to provide a produce with a narrow bezel and provide a touch display panel with a large size.

The transmitter electrodes 5 may be arranged between the black matrices 4 and the first base substrate 4, or at a side of the black matrices 4 away from the first base substrate 3. When the transmitter electrodes 5 may be arranged between the black matrices 4 and the first base substrate 3, the display effect of the touch display panel may be adversely affected by the transmitter electrodes 5 because the light may usually be reflected by the metal. Hence, the transmitter electrodes 5 are arranged at a side of the black matrices away from the first base substrate.

Further, the touch display panel includes a transparent shielding layer 6 arranged between the transmitter electrodes 5 and the liquid crystal layer, and it may be made of a transparent conductive layer. The transparent shielding layer 6 may be used to eliminate the influence of the touch signal on the deflection of the liquid crystals, thereby to ensure the display effect of the touch display panel. The transparent shielding layer 6 may be used to avoid the mutual interference between the signal on TFT and the touch signal, thereby to ensure the sensitivity of the touch display panel. In addition, for the touch display panel where the common electrode serves as the transmitter electrode, it is able to overcome the defect caused when the common electrode signal and the touch signal are multiplexed in a time-division manner, thereby to provide the TN-type touch display panel with a large size and a high PPI.

In this embodiment, a second planarization layer 16 is arranged at a pixel region defined by the black matrices 4, a color filter layer 14 is arranged on the second planarization layer 16, a first planarization layer 15 is arranged on the color filter layer 14, and the transparent shielding layer 6 is arranged on the first planarization layer 15. In other words, the receiver electrodes 2 and the polarizer 1 are arranged sequentially at a side of the first base substrate 3 away from the liquid crystal layer, and the black matrices 4, the transmitter electrodes 5, the second planarization layer 16, the color filter layer 14, the first planarization layer 15 and the transparent shielding layer 6 are arranged sequentially at a side of the first base substrate 3 facing the liquid crystal layer.

Figure 2:
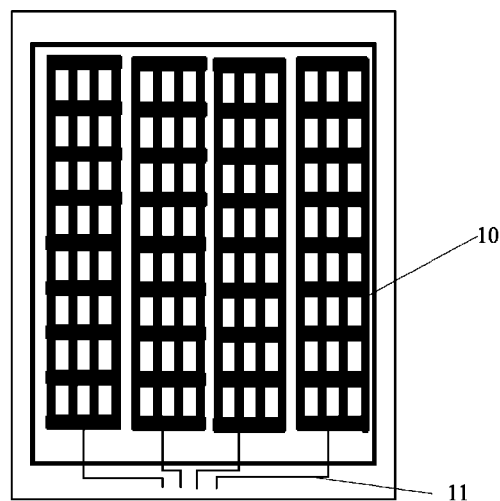
FIG. 2 is a planar view of a transmitter electrode according to the first embodiment of the present disclosure.
Figure 3:
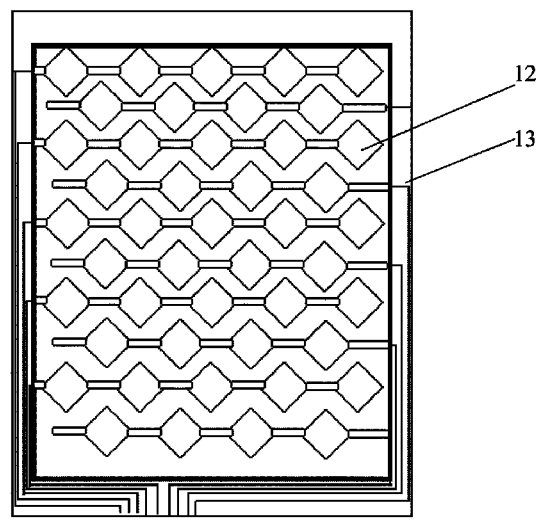
FIG. 3 is a planar view of a receiver electrode according to the first embodiment of the present disclosure.

As shown in FIGS. 2 and 3, the transmitter electrode 5 may be of a strip-like shape denoted by reference number 10, and connected to a peripheral circuit through a peripheral wire 11 of the transmitter electrode 5. The receiver electrode 2 may be of a diamond-like shape denoted by reference number 12, and connected to the peripheral circuit through a peripheral wire 13 of the receiver electrode 2. Further, the receiver electrode 2 may be of a strip or grid-like shape.

During the manufacture of the touch display panel, the black matrices 4, the transmitter electrodes 5, the second planarization layer 16, the color filter layer 14, the first planarization layer 15, the transparent shielding layer 5 and a spacer may be arranged sequentially on the first base substrate 3, and then the resultant color filter substrate is arranged opposite to the array substrate to form a cell. Next, the receiver electrodes 2 are arranged at a side of the first base substrate 3 away from the array substrate, and the polarizers are adhered onto the color filter substrate and the array substrate, respectively, so as to form the touch display panel.

Further, the receiver electrodes 2 may also be arranged at a side of the first base substrate 3, and the black matrices 4, the transmitter electrodes 5, the second planarization layer 16, the color filter layer 14, the first planarization layer 15, the transparent shielding layer 6 and the spacer may be arranged sequentially at the other side of the first base substrate 3. Then, the resultant color filter substrate may be arranged opposite to the array substrate to form a cell, and the polarizers may be adhered onto the color filter substrate and the array substrate, respectively, so as to form the touch display panel.

Second Embodiment

A transmitter electrode is made of a transparent conductive layer at an inner side of a color filter substrate in the related art, so the deflection of liquid crystals may be disturbed by a touch signal, and thereby a display effect of a touch display panel may be adversely affected. In addition, mutual interference between a signal on a TFT and the touch signal may occur, so the sensitivity of the touch display panel may be reduced. Further, for a display panel where a common electrode serves as the transmitter electrode, a common electrode signal and the touch signal may be multiplexed in a time-division manner, so the time for the common electrode signal and scanning the touch signal is inadequate, thereby it is impossible to provide a product with a large size and a high pixel per inch (PPI). Meanwhile, the resistivity of the transparent conductive layer is relatively high, and when the transmitter electrode and the receiver electrode are made of the transparent conductive layer, the touch display panel may be of relatively large load, and its sensitivity may be further reduced. In order to reduce the load, it is required to provide a wider peripheral wire. However, at this time, it is unable to provide a product with a narrow bezel, so this is merely applicable to a small-sized touch display panel.

Figure 4:
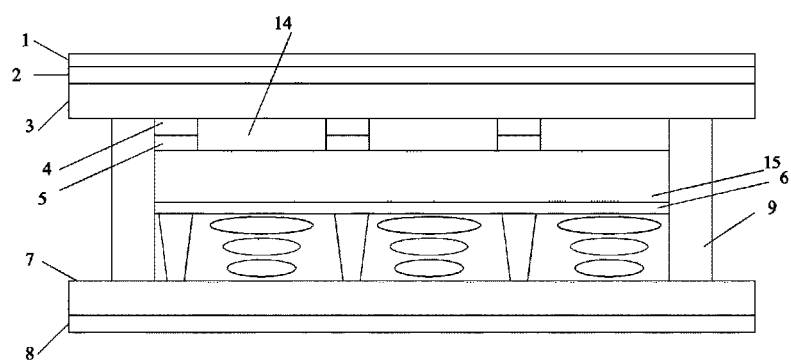
FIG. 4 is a sectional view of the touch display panel according to the second embodiment of the present disclosure.

In order to overcome the above drawbacks, the present disclosure provides in this embodiment a touch display panel. As shown in FIG. 4, the touch display panel includes a color filter substrate, an array substrate, and a liquid crystal layer arranged between the color filter substrate and the array substrate. The color filter substrate includes a first base substrate 3, and the array substrate includes a second base substrate 7. Polarizers 1 and 8 are adhered onto the first base substrate 3 and the second base substrate 7, respectively. The color filter substrate and the array substrate are packaged together through a sealant 9.

A plurality of second electrodes made of a transparent conductive layer is arranged parallel to each other at a side of the first base substrate 3 away from the array substrate, and the second electrodes are arranged between the first base substrate 3 and the polarizer 1. A plurality of first electrodes made of metal is arranged parallel to each other at a side of the first base substrate 3 facing the array substrate, and a projection of each first electrode onto the first base substrate 3 in a perpendicular direction completely falls within a range of a corresponding black matrix 4. In this embodiment, the first electrode is a transmitter electrode 5, and the second electrode is a receiver electrode 2. According to this embodiment, the transmitter electrodes 5 are made of non-transparent metal, and the projection of each transmitter electrode 5 onto the first base substrate 3 in the perpendicular direction falls within the range of the corresponding black matrix 4. In this way, because of the non-transparent black matrices 4, the light transmission of the touch display panel may not be adversely affected by the transmitter electrodes 5. To be specific, the transmitter electrode 5 may be made of a metal material with good conductivity, such as Mo, Al, Cu or Ag, so as to reduce the load of the touch display panel, thereby to reduce the power consumption and improve the sensitivity thereof. Meanwhile, it is also able to reduce a width of a peripheral wire, thereby to provide a produce with a narrow bezel and provide a touch display panel with a large size.

The transmitter electrodes 5 may be arranged between the black matrices 4 and the first base substrate 4, or at a side of the black matrices 4 away from the first base substrate 3. When the transmitter electrodes 5 may be arranged between the black matrices 4 and the first base substrate 3, the display effect of the touch display panel may be adversely affected by the transmitter electrodes 5 because the light may usually be reflected by the metal. Hence, the transmitter electrodes 5 may be treated with an anti-reflection process, or manufactured as narrow as possible so that they can hardly be viewed by human eyes.

Further, the touch display panel includes a transparent shielding layer 6 arranged between the transmitter electrodes 5 and the liquid crystal layer, and it may be made of a transparent conductive layer. The transparent shielding layer 6 may be used to eliminate the influence of the touch signal on the deflection of the liquid crystals, thereby to ensure the display effect of the touch display panel. The transparent shielding layer 6 may be used to avoid the mutual interference between the signal on TFT and the touch signal, thereby to ensure the sensitivity of the touch display panel. In addition, for the touch display panel where the common electrode serves as the transmitter electrode, it is able to overcome the defect caused when the common electrode signal and the touch signal are multiplexed in a time-division manner, thereby to provide the TN-type touch display panel with a large size and a high PPI.

In this embodiment, a color filter layer 14 is arranged at a pixel region defined by the black matrices 4, a first planarization layer 15 is arranged on the color filter layer 14, and the transparent shielding layer 6 is arranged on the first planarization layer 15. In other words, the receiver electrodes 2 and the polarizers 1 are arranged sequentially at a side of the first base substrate 3 away from the liquid crystal layer, and the black matrices 4, the transmitter electrodes 5, the color filter layer 14, the first planarization layer 15 and the transparent shielding layer 6 are arranged sequentially at a side of the first base substrate 3 facing the liquid crystal layer.

As shown in FIGS. 2 and 3, the transmitter electrode 5 may be of a strip-like shape denoted by reference number 10, and connected to a peripheral circuit through a peripheral wire 11 of the transmitter electrode 5. The receiver electrode 2 may be of a diamond-like shape denoted by reference number 12, and connected to the peripheral circuit through a peripheral wire 13 of the receiver electrode 2. Further, the receiver electrode 2 may be of a strip or grid-like shape.

During the manufacture of the touch display panel, the black matrices 4, the transmitter electrodes 5, the color filter layer 14, the first planarization layer 15, the transparent shielding layer 6 and a spacer may be arranged sequentially on the first base substrate 3, and then the resultant color filter substrate may be arranged opposite to the array substrate to form a cell. Next, the receiver electrodes 2 may be arranged at a side of the first base substrate 3 away from the array substrate, and the polarizers may be adhered onto the color filter substrate and the array substrate, respectively, so as to form the touch display panel.

Further, the receiver electrodes 2 may be arranged at a side of the first base substrate 3, and the black matrices 4, the transmitter electrodes 5, the color filter layer 14, the first planarization layer 15, the transparent shielding layer 6 and the spacer may be arranged sequentially at the other side of the first base substrate 3. Then, the resultant color filter substrate may be arranged opposite to the array substrate to form a cell, and the polarizers may be adhered onto the color filter substrate and the array substrate, respectively, so as to form the touch display panel.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:
1. A touch display panel, comprising:
   a color filter substrate, an array substrate arranged opposite to the color filter substrate, and a liquid crystal layer arranged between the color filter substrate and the array substrate, black matrices being arranged on the color filter substrate, wherein
   a plurality of first electrodes made of metal is arranged parallel to each other on the color filter substrate, and a projection of each first electrode onto the color filter substrate in a perpendicular direction completely falls within a range of a corresponding black matrix;
   a plurality of second electrodes made of a transparent conductive layer is further arranged parallel to each other on the color filter substrate, and the second electrodes are insulated from, and cross, the first electrodes;
   the plurality of first electrodes is arranged below the black matrix, and the plurality of second electrodes is arranged above the black matrix;
   the first electrodes are arranged at a side of the color filter substrate facing the array substrate, and the second electrodes are arranged at a side of the color filter substrate away from the array substrate;
   a transparent shielding layer arranged between the first electrodes and the liquid crystal layer;
   a first planarization layer arranged between the transparent shielding layer and the first electrodes;
   a second planarization layer arranged at a pixel region defined by the black matrices and a color filter layer arranged on the second planarization layer, and the first planarization layer is arranged on the color filter layer; and the second planarization layer has a thickness equal to a sum of a thickness of the first electrode and a thickness of the black matrix.

2. The touch display panel according to claim 1, wherein the first electrodes are transmitter electrodes and the second electrodes are receiver electrodes, or the first electrodes are receiver electrodes and the second electrodes are transmitter electrodes.

3. The touch display panel according to claim 1, wherein the first electrodes are transmitter electrodes, and the second electrodes are receiver electrodes.

4. The touch display panel according to claim 1, wherein the first electrodes are arranged at a side of the black matrices facing the array substrate.

5. The touch display panel according to claim 1, wherein the touch display panel further comprises a color filter layer arranged at a pixel region defined by the black matrices, and the first planarization layer is arranged on the color filter layer.

6. The touch display panel according to claim 5, wherein the color filter layer has a thickness equal to a sum of a thickness of the first electrode and a thickness of the black matrix.

7. The touch display panel according to claim 1, wherein the first electrode is made of a material selected from the group consisting of Mo, Al, Cu and Ag.

8. The touch display panel according to claim 1, wherein the first electrodes are arranged perpendicular to the second electrodes.

9. The touch display panel according to claim 1, wherein the first electrodes and the second electrodes are each of a diamond, strip or grid-like shape.

10. The touch display panel according to claim 1, wherein the transparent shielding layer serves as a common electrode.

11. The touch display panel according to claim 1, wherein respective first electrodes of the plurality of first electrodes are aligned with a corresponding black matrix.

12. A touch display device comprising:
a touch display panel according to claim 1.

13. The touch display device according to claim 12, wherein the first electrodes are transmitter electrodes and the second electrodes are receiver electrodes, or the first electrodes are receiver electrodes and the second electrodes are transmitter electrodes.

14. The touch display device according to claim 12, wherein the first electrodes are arranged at a side of the color filter substrate facing the array substrate, and the second electrodes are arranged at a side of the color filter substrate away from the array substrate.

15. The touch display device according to claim 14, wherein the first electrodes are transmitter electrodes, and the second electrodes are receiver electrodes.

16. A touch display panel, comprising:
a color filter substrate, an array substrate arranged opposite to the color filter substrate, and a liquid crystal layer arranged between the color filter substrate and the array substrate, black matrices being arranged on the color filter substrate, wherein a plurality of first electrodes made of metal is arranged parallel to each other on the color filter substrate, and a projection of each first electrode onto the color filter substrate in a perpendicular direction completely falls within a range of a corresponding black matrix;

a plurality of second electrodes made of a transparent conductive layer is further arranged parallel to each other on the color filter substrate, and the second electrodes are insulated from, and cross, the first electrodes;

the plurality of first electrodes is arranged below the black matrix, and the plurality of second electrodes is arranged above the black matrix;

the first electrodes are arranged at a side of the color filter substrate facing the array substrate, and the second electrodes are arranged at a side of the color filter substrate away from the array substrate;

a transparent shielding layer arranged between the first electrodes and the liquid crystal layer;

a first planarization layer arranged between the transparent shielding layer and the first electrodes;

a color filter layer arranged at a pixel region defined by the black matrices, and the first planarization layer is arranged on the color filter layer; and the color filter layer has a thickness equal to a sum of a thickness of the first electrode and a thickness of the black matrix.

17. The touch display panel according to claim 16, wherein the first electrode is made of a material selected from the group consisting of Mo, Al, Cu and Ag.

18. The touch display panel according to claim 16, wherein the first electrodes are arranged perpendicular to the second electrodes.

* * * * *